United States Patent [19]

Shirai et al.

[11] Patent Number: 5,340,115

[45] Date of Patent: Aug. 23, 1994

[54] SHOOTING SCOPE USED IN SHOOTING GAME SYSTEM

[75] Inventors: Ichiro Shirai; Kenichi Sugino, both of Kyoto, Japan

[73] Assignee: Nintendo Co., Ltd., Kyoto, Japan

[21] Appl. No.: 122,177

[22] Filed: Sep. 17, 1993

Related U.S. Application Data

[63] Continuation of Ser. No. 984,442, Dec. 2, 1992, abandoned.

[30] Foreign Application Priority Data

Dec. 28, 1991 [JP] Japan ............................. 3-358481

[51] Int. Cl.⁵ .............................. F41J 5/02; F41J 9/14
[52] U.S. Cl. ................................ 273/310; 434/20; 434/21; 33/250; 33/252
[58] Field of Search ............................. 273/310–312; 434/20–22; 33/250, 252, 249, 245, 260; 446/127, 473

[56] References Cited

U.S. PATENT DOCUMENTS

| | | | |
|---|---|---|---|
| 410,422 | 9/1889 | Long | 33/260 |
| 1,835,576 | 12/1931 | Sparr | 33/248 |
| 3,579,840 | 5/1971 | Heinzel | 33/250 |
| 3,960,380 | 6/1976 | Yokoi | 273/311 |
| 4,205,847 | 6/1980 | Steiger et al. | 273/313 |
| 4,395,045 | 7/1983 | Baer | 273/312 |
| 4,534,735 | 8/1985 | Allard et al. | 434/20 |
| 4,583,950 | 4/1986 | Schroeder | 434/22 |
| 4,654,008 | 3/1987 | Elmore | 434/16 |
| 4,659,008 | 4/1987 | Howett et al. | 232/43.3 |
| 4,804,350 | 2/1989 | Chen | 446/127 |
| 4,824,374 | 4/1989 | Hendry et al. | 434/22 |
| 4,835,895 | 6/1989 | Bowen | 42/101 |
| 4,844,475 | 7/1989 | Saffer et al. | 273/311 |
| 4,844,476 | 7/1989 | Becker | 273/312 |
| 4,962,589 | 10/1990 | La Rosa | 33/233 |

FOREIGN PATENT DOCUMENTS

| | | | |
|---|---|---|---|
| 339604 | 7/1921 | Fed. Rep. of Germany . | |
| 2426249 | 12/1974 | Fed. Rep. of Germany . | |
| 3021667 | 12/1980 | Fed. Rep. of Germany . | |
| 3724449 | 1/1988 | Fed. Rep. of Germany . | |
| 2365095 | 5/1978 | France | 33/250 |
| 1472480 | 5/1977 | United Kingdom . | |
| 2086013 | 5/1982 | United Kingdom . | |

*Primary Examiner*—Benjamin H. Layno
*Attorney, Agent, or Firm*—Nixon and Vanderhye

[57] ABSTRACT

Engaging claws (15) and (16) are provided in the upper right front part in the longitudinal direction of a barrel (8), and engaging claws (18) and (19) are provided in the upper left part thereof. A gunsight (10) is held in the barrel (8) by the engaging claws (15) and (16) or by the engaging claws (18) and (19). Consequently, the position where the gunsight (10) is mounted can be changed to a position where a player can easily use the gunsight (10). In addition, each of the engaging claws releases its engaged state by its elastic force to detach the gunsight (10) from the barrel (8) when a strong shock is given to the gunsight (10). Consequently, it is possible to prevent the gunsight (10) from being damaged or prevent the player from being injured.

18 Claims, 10 Drawing Sheets

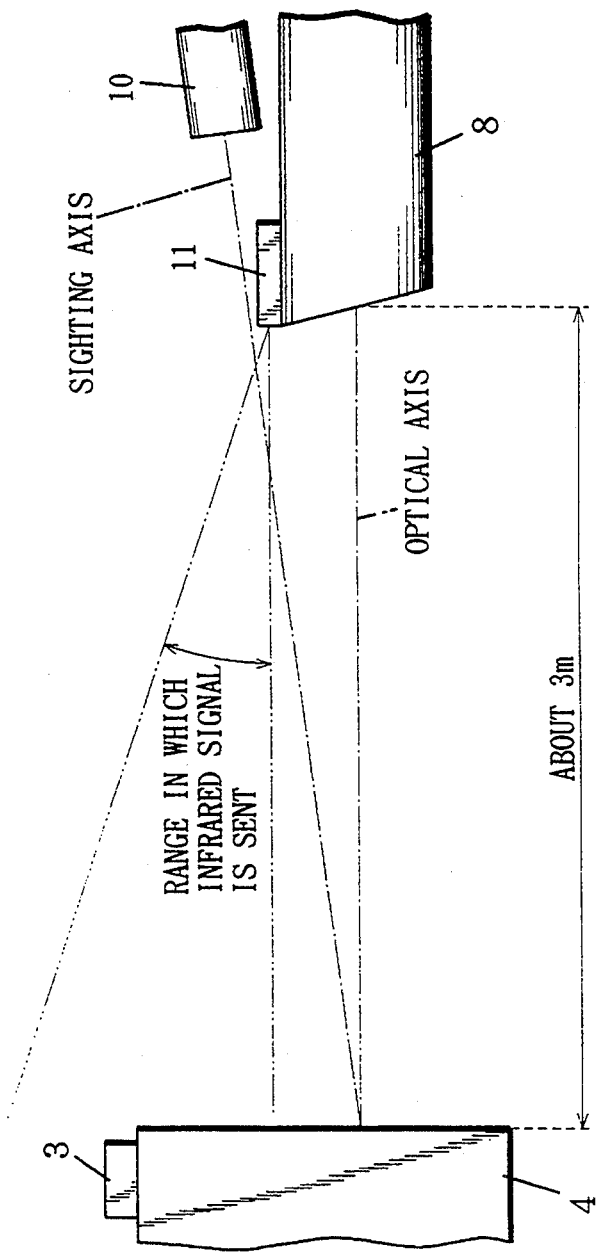

000
SHOOTING SCOPE USED IN SHOOTING GAME SYSTEM

This is a continuation of application Ser. No. 07/984,442, filed Dec. 2, 1992, now abandoned.

BACKGROUND OF THE INVENTION

1. Field of the Invention

The present invention relates generally to a shooting scope used in a shooting game system. More particularly, it relates to a shooting scope used in a game system which progresses by displaying an image from a video game set on the screen of an image display device such as a television receiver and shooting a target displayed on the image display device from a position spaced apart from the target.

2. Description of the Background Art

A conventional shooting scope for shooting a target displayed on a television receiver to play a game, is disclosed in U.S. Pat. No. 4,395,045 (hereinafter referred to as first prior art). Another conventional shooting scope (trade name "Pro Beam") is used in a game set (trade name "Nintendo Entertainment System") which is sold by the applicant of the present application (hereinafter referred to as second prior art).

In the above described first prior art, there is no gunsight. Therefore, the first prior art has the disadvantage in that one cannot accurately aim at a target displayed on a television receiver.

On the other hand, in the above described second prior art, a gunsight is integrally provided in the upper front part in the longitudinal direction of a barrel. The second prior art has the disadvantage in that the position of the gunsight is always fixed irrespective of whether a player is right-handed or left-handed, making it difficult to aim at a target with high precision. In addition, it has the disadvantage in that if the gunsight is fixed to either one of the right side and the left side of the barrel, the shooting scope is difficult to operate depending on the dominant hand or the dominant eye of a user. Furthermore, the second prior art also has the disadvantage in that when the shooting scope receives a shock (for example, due to dropping), its force is concentrated on the gunsight projected from the main body, so that the gunsight is liable to be damaged. Additionally, it also has the disadvantage in that when the gunsight is damaged, a player is liable to be injured.

SUMMARY OF THE INVENTION

Therefore, an object of the present invention is to provide a shooting scope which can be aimed at a target with high precision, is superior in operability, is not easily damaged, and is highly safe.

The present invention provides a shooting scope used for a game in which an image from a video game set is displayed on an image display device and a target displayed on the image display device is shot from a position spaced apart from the target, which comprises a cylindrical barrel, a gunsight detachably mounted on the upper front part in the longitudinal direction of the barrel for sighting the target displayed on the screen of the image display device, light receiving means provided inside of the barrel for receiving light from the image display device, an engaging portion formed in a lower mounting portion of the gunsight, a pair of holding means provided in positions symmetrical on both the right and left sides with respect to an optical axis of the light receiving means as viewed from above the barrel and engaged with the engaging portion in the gunsight to hold the gunsight in the barrel, operating means provided in any position of the barrel, and signal generating means for applying a signal to the video game set in response to an operation of the operating means.

As described above, according to the present invention, the pair of holding means for holding the gunsight in the barrel is provided in the positions symmetrical on both the right and left sides with respect to the optical axis of the light receiving means as viewed from above the barrel. Consequently, a player can change the position where the gunsight is mounted such that he can easily use the gunsight. As a result, a shooting scope superior in operability is obtained.

In accordance with another aspect of the present invention, a sighting axis of the gunsight and an optical axis of the light receiving means form an intersection in a position spaced apart from the muzzle of the barrel by a predetermined distance. With the shooting scope used in the game set, a target in a relatively short distance from the shooting scope is shot. Accordingly, if the distance between the television receiver and the shooting scope in a state where the shooting scope is usually used is previously determined and the above described intersection is formed in a position spaced apart from the barrel by this distance, it is possible to sight the target more accurately.

In accordance with another aspect of the present invention, each of engaging claws releases the engaged state when a strong force is exerted on the gunsight. Accordingly, the gunsight is easily detached from the barrel. Consequently, no excessive force is exerted on the gunsight, so that the gunsight can be prevented from being damaged. In addition, it is possible to prevent a player from being injured due to the damage.

In accordance with still another aspect of the present invention, a stock is formed on the lower rear part in the longitudinal direction of the barrel. Consequently, a player can hold the shooting scope stably.

In accordance with a further aspect of the present invention, a shooting signal is generated in a single-shot manner if a first switch is depressed, while being continuously generated if a second switch is depressed. Consequently, a player can enjoy different types of shooting feelings.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 10 is a diagram showing the relationship between an optical axis of the barrel and a sighting axis of the gunsight in the shooting scope according to one embodiment of the present invention.

DESCRIPTION OF THE PREFERRED EMBODIMENTS

Figure 1:
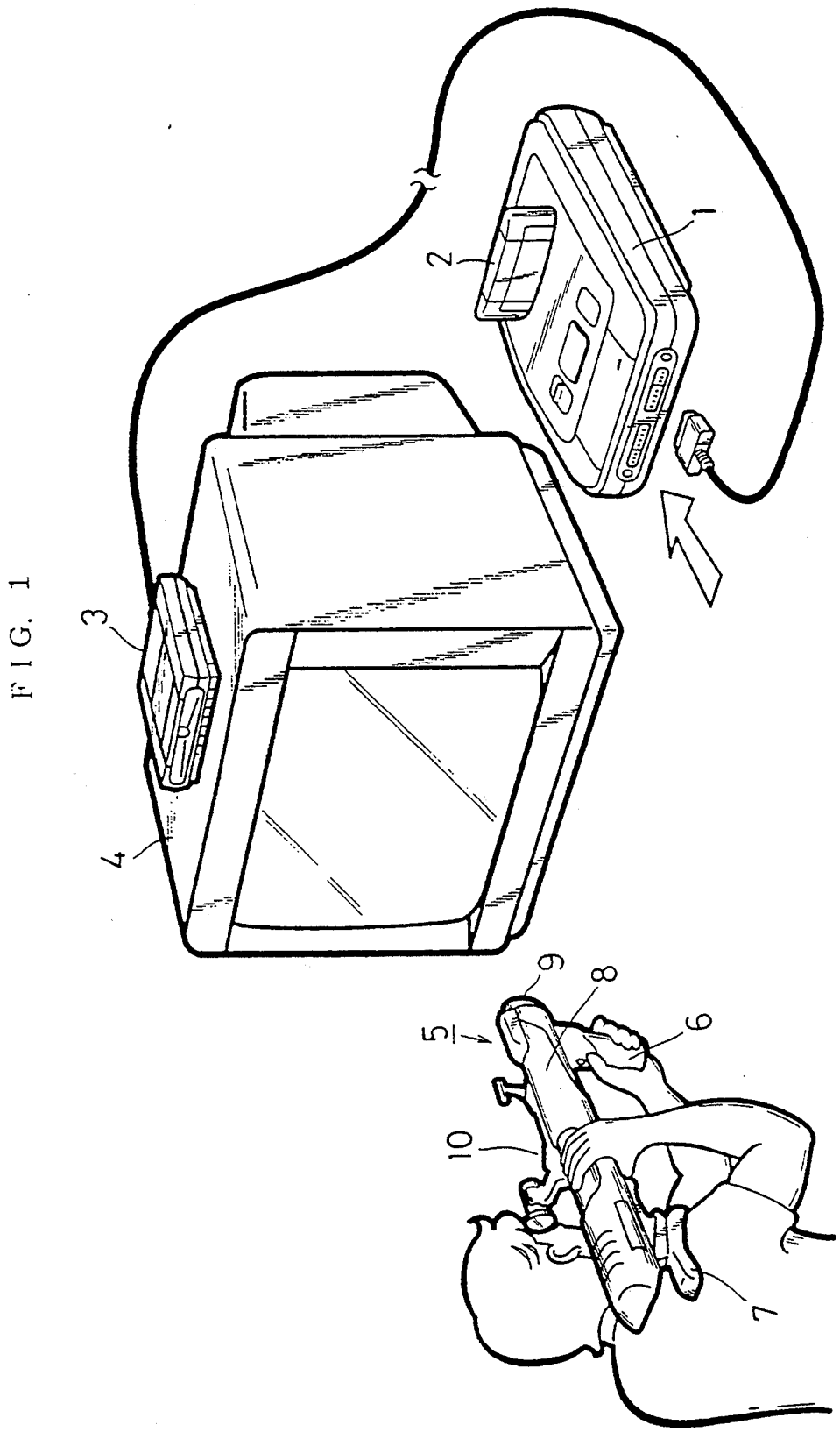
FIG. 1 is an illustration showing one example of a state where a shooting scope according to one embodiment of the present invention is used.

FIG. 1 is a perspective view showing a state where a shooting scope according to one embodiment of the present invention is used. In FIG. 1, a cartridge 2 containing a memory storing program data is detachably mounted on a video game set 1, and a receiver 3 is connected thereto. The video game set 1 is further connected to a television receiver 4 to display images of a target, a background and the like for a game on the television receiver 4 on the basis of the program data.

A player grasps a grip 6 of a shooting scope 5 in his one hand (his left hand if he is right-handed), carries the shooting scope 5 with a stock 7 on his shoulder, and puts his other hand (his right hand if he is right-handed) in an approximately central part in the longitudinal direction of a barrel 8 to hold the shooting scope 5. The player uses the shooting scope 5 with a muzzle 9 being directed toward the television receiver 4 from a place spaced apart from the receiver 3. A control signal is converted into a light signal of infrared rays or the like to be transmitted to the receiver 3 in response to operations of a plurality of switches provided in an approximately central part in the longitudinal direction of the shooting scope 5. The video game set 1 changes image displayed on the television receiver 4 and outputs voice signal in conformity with the progress of the game on the basis of the program data in response to the signal from the receiver 3.

A gunsight 10 mounted on the upper part of the barrel 8 is so detachably constructed that it can be mounted on the right or left side to suit to player's own convenience.

Figure 2:
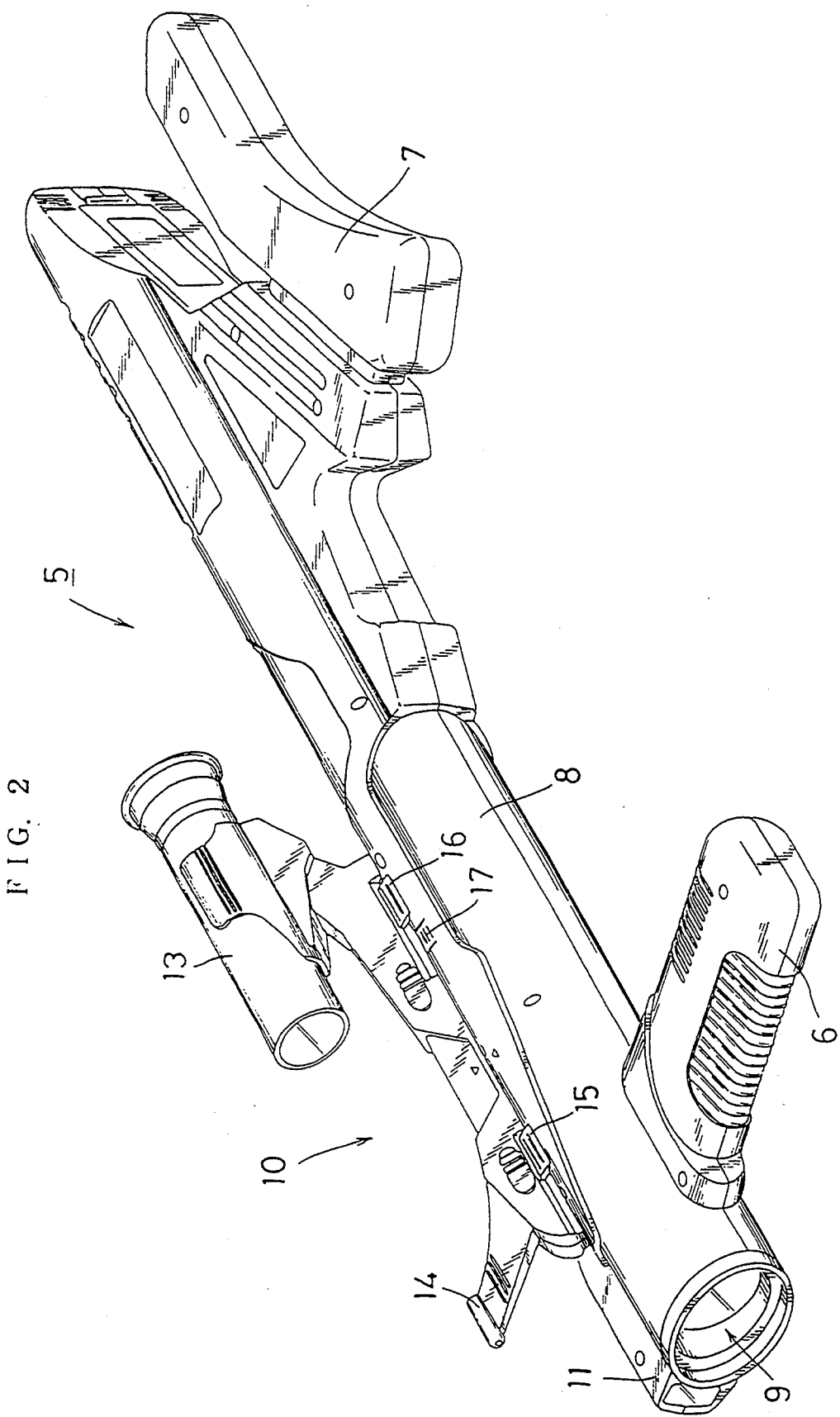
FIG. 2 is a perspective view illustrating the shooting scope according to one embodiment of the present invention as viewed from below.
Figure 3:
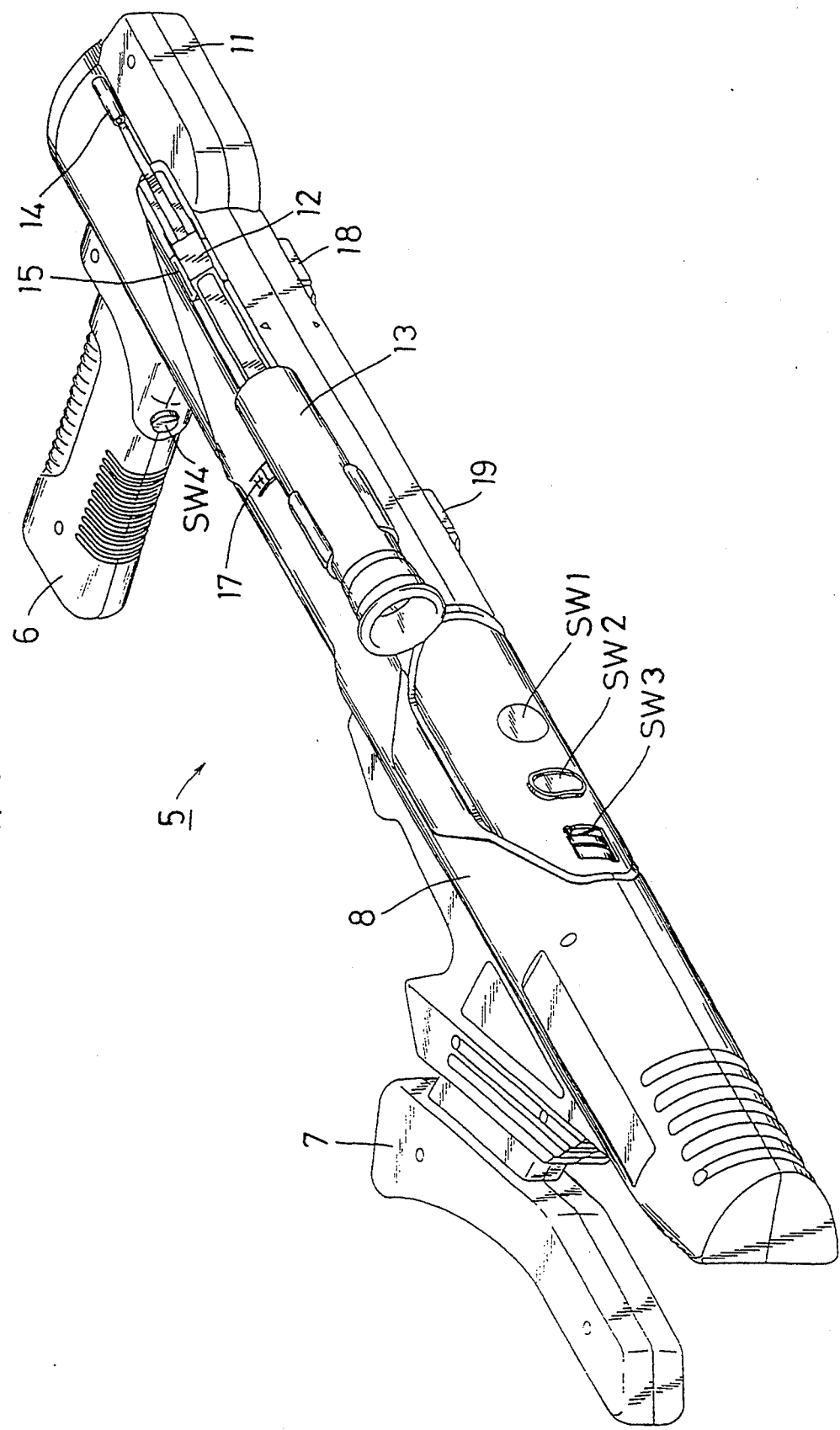
FIG. 3 is a perspective view illustrating the shooting scope according to one embodiment of the present invention as viewed from above.
Figure 4:
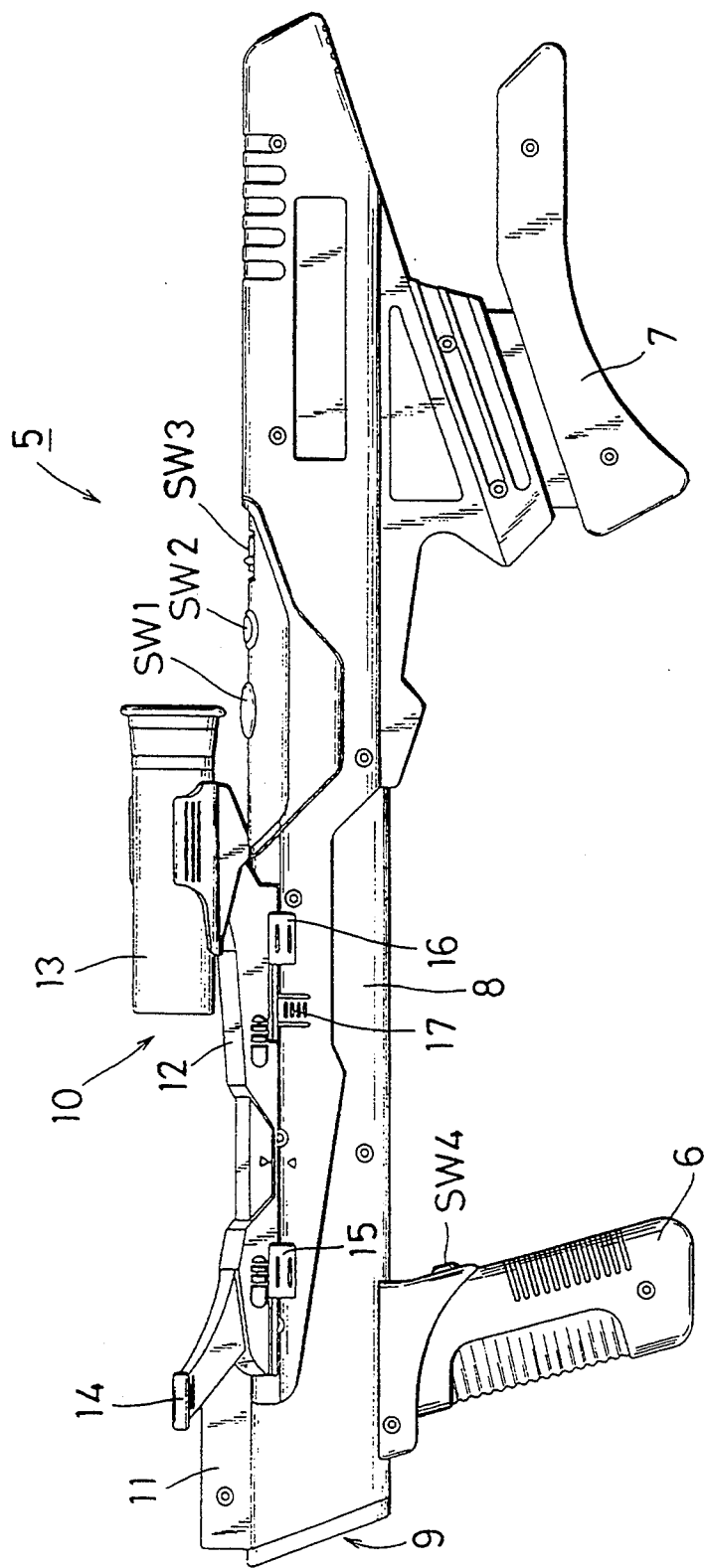
FIG. 4 is a right side view illustrating the shooting scope according to one embodiment of the present invention.
Figure 5:
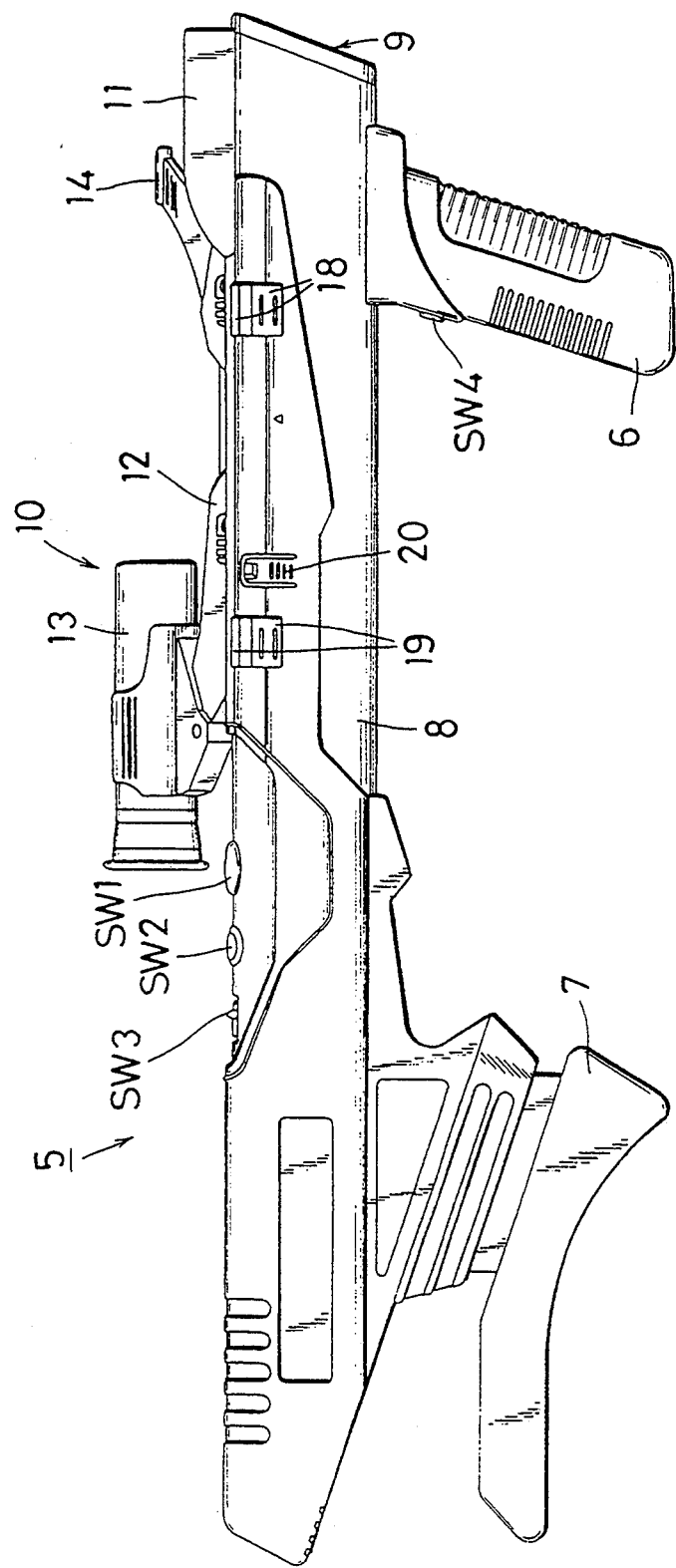
FIG. 5 is a left side view illustrating the shooting scope according to one embodiment of the present invention.
Figure 6:
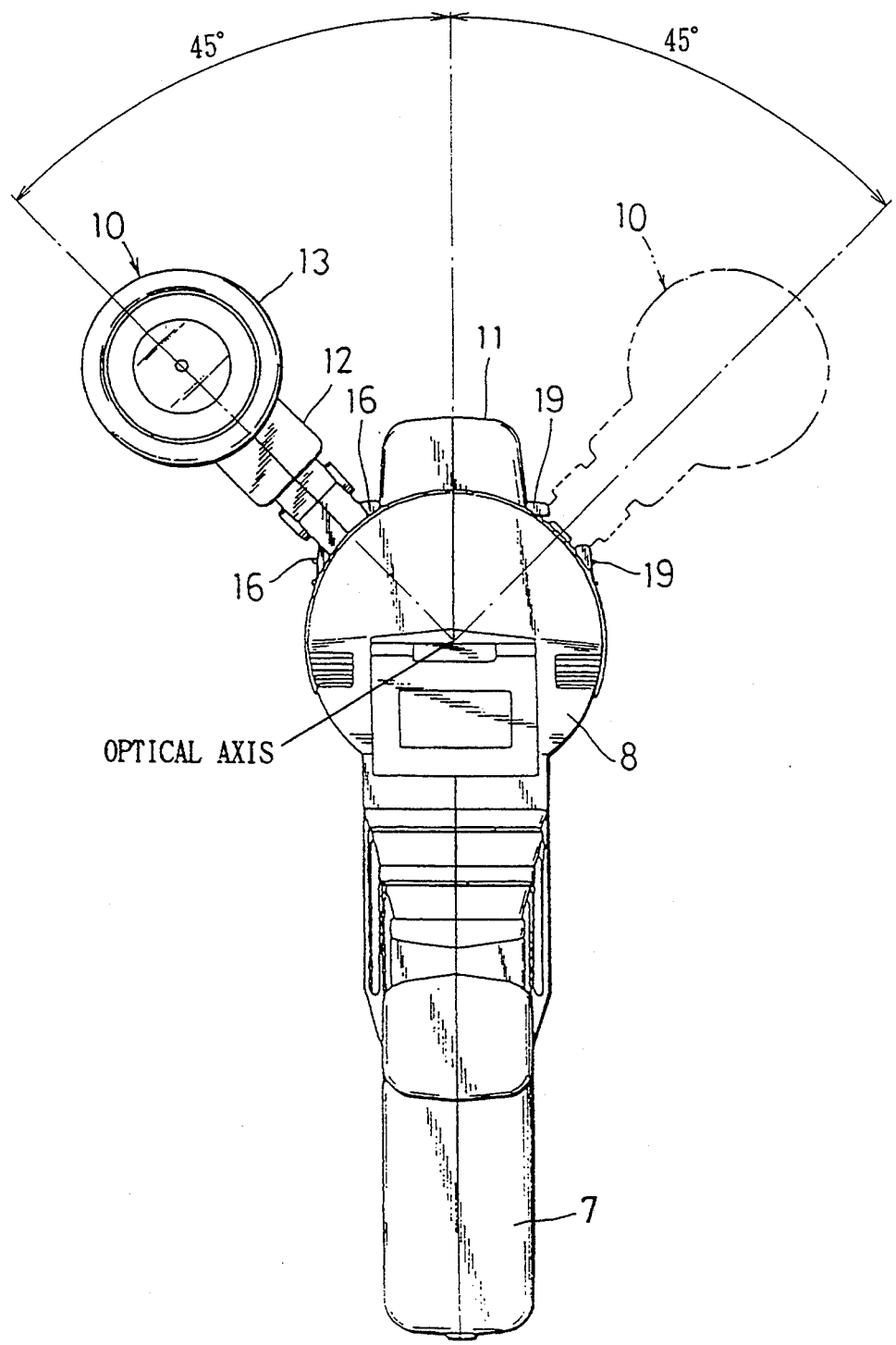
FIG. 6 is a rear elevation illustrating the shooting scope according to one embodiment of the present invention.

FIGS. 2 to 6 are diagrams illustrating the shooting scope according to one embodiment of the present invention, where FIG. 2 is a perspective view illustrating the shooting scope as viewed from below, FIG. 3 is a perspective view illustrating the shooting scope as viewed from above, FIG. 4 is a right side view illustrating the shooting scope, FIG. 5 is a left side view illustrating the shooting scope, and FIG. 6 is a rear elevation illustrating the shooting scope. Referring now to FIGS. 2 to 6, the construction of the shooting scope according to one embodiment of the present invention will be described.

A stock 7 is provided on the lower rear part in the longitudinal direction of a barrel 8. In addition, a grip 6 is provided on the lower front part in the longitudinal direction of the barrel 8. Further, a gunsight 10 is detachably mounted on the upper front part in the longitudinal direction of the barrel 8. An infrared transmitter 11 is contained in the upper front part in the longitudinal direction of the barrel 8. A trigger switch SW1, a pause switch SW2, a power supply/continuous shooting switch SW3 are provided in an approximately central part of the barrel 8 and at the rear of the gunsight 10. The trigger switch SW1 and the pause switch SW2 are constructed as push button switches, and the power supply/continuous shooting switch SW3 is constructed as a slide switch. The trigger switch SW1 generates a single shooting signal when it is depressed. The pause switch SW2 generates a pause signal when it is depressed. The power supply/continuous shooting switch SW3 has three stopped positions, and gives a command to turn the power supply off in the first stopped position, to turn the power supply on in the second stopped position, and to select a shooting mode in the third stopped position. A cursor switch SW4 is provided on the upper part of the rear side surface of the grip 6. This cursor switch SW4 generates a display command signal of a cursor when it is depressed.

The gunsight 10 comprises a mount 12, and a scope 13 and a foresight 14 which are held on the mount 12. The mount 12 is fixedly held on the barrel 8 by engaging claws 15 and 16 formed in the barrel 8. In addition, the mount 12 is so locked by a locking claw 17 formed in the barrel 8 so that it does not slip off the engaging claws 15 and 16.

More specifically, as viewed from rear surface of the barrel 8 shown in FIG. 6, the engaging claws 15 and 16 are provided in the upper left front part in the longitudinal direction of the barrel 8 (in the upper right part as viewed from a muzzle 9), and engaging claws 18 and 19 are formed in the upper right front part in the longitudinal direction of the barrel 8 (in the upper left part as viewed from the muzzle 9). In other words, the engaging claws 15 and 16 and the engaging claws 18 and 19 in the right and left groups are respectively formed in positions symmetrical with respect to an optical axis of the barrel 8 (for example, positions at an angle of 45° with the vertical axis passing through the optical axis as viewed from the rear surface), and the engaging claws in the same group are spaced apart from each other by a predetermined distance in the longitudinal direction of the barrel 8. Locking claws 17 and 20 are respectively formed between the engaging claws 15 and 16 and between the engaging claws 18 and 19.

Consequently, the gunsight 10 can be detached from the engaging claws 15 and 16 and mounted on the engaging claws 18 and 19. Therefore, the position where the gunsight 10 is mounted can be changed to the most suitable position depending on whether a user is right-handed or left-handed, the target can be aimed at with high precision, and the operability can be improved.

Figure 7:
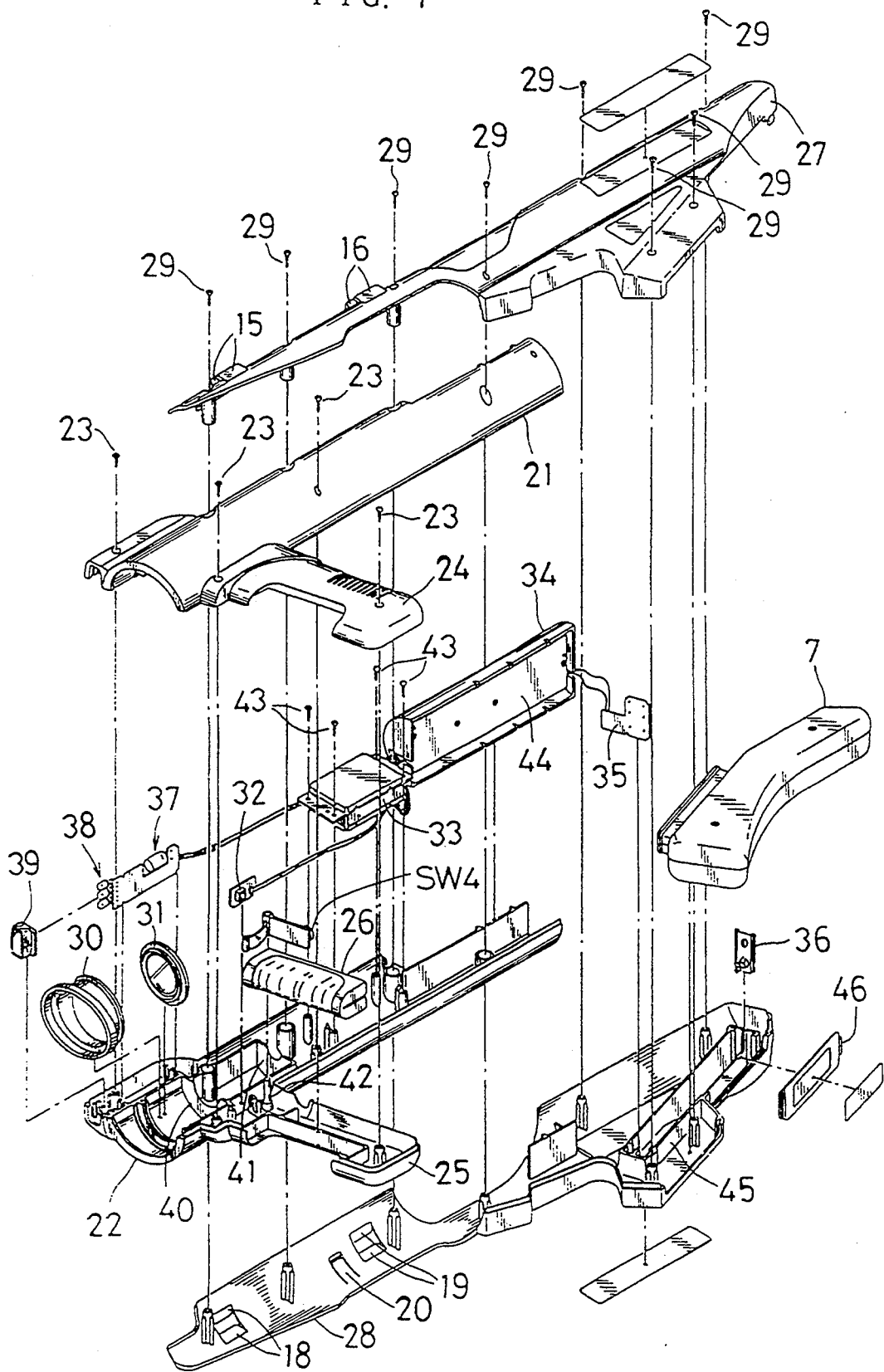
FIG. 7 is an exploded perspective view illustrating a main body portion of the shooting scope according to one embodiment of the present invention.
Figure 8:
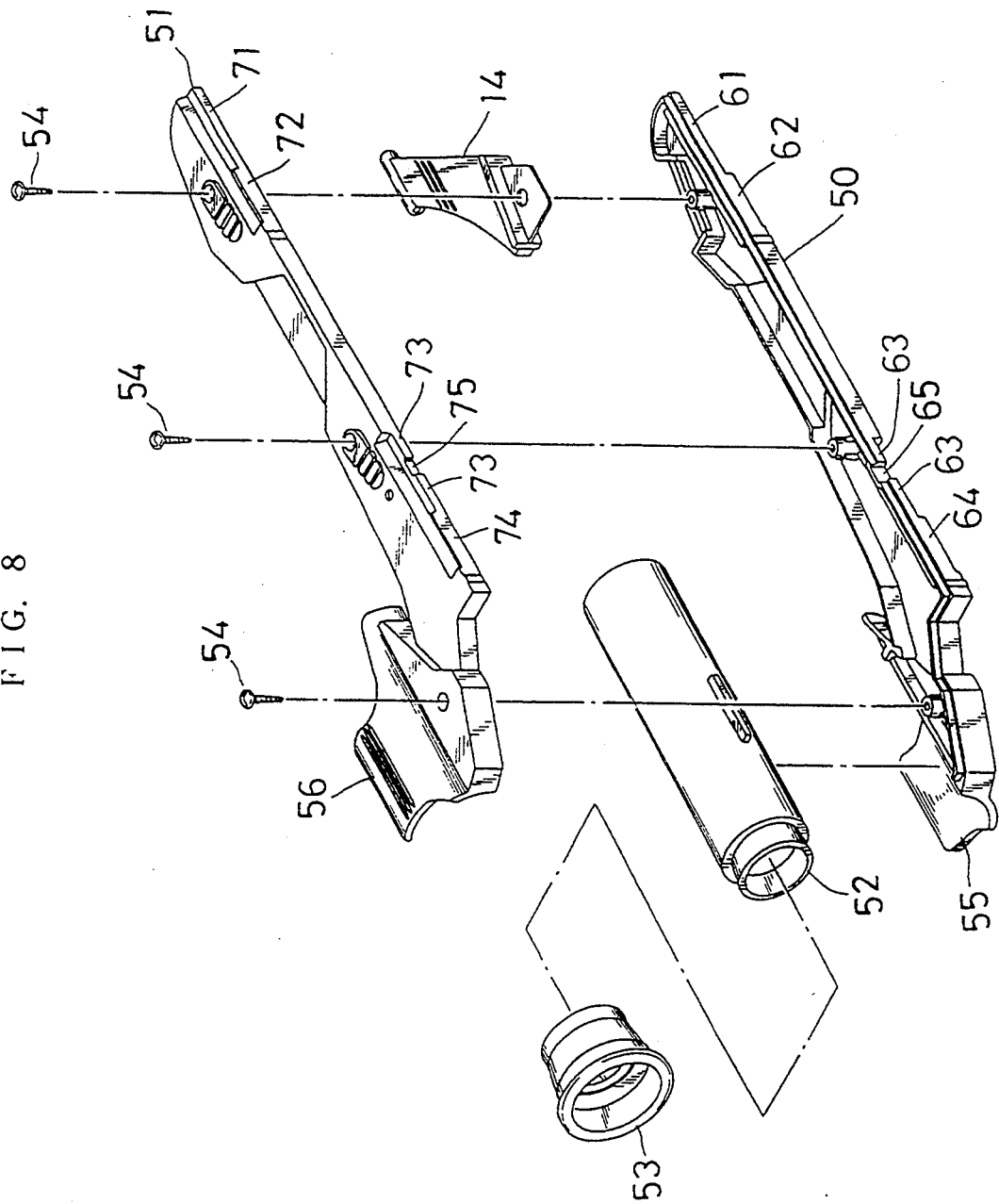
FIG. 8 is an exploded perspective view illustrating a gunsight in the shooting scope according to one embodiment of the present invention.
Figure 9:
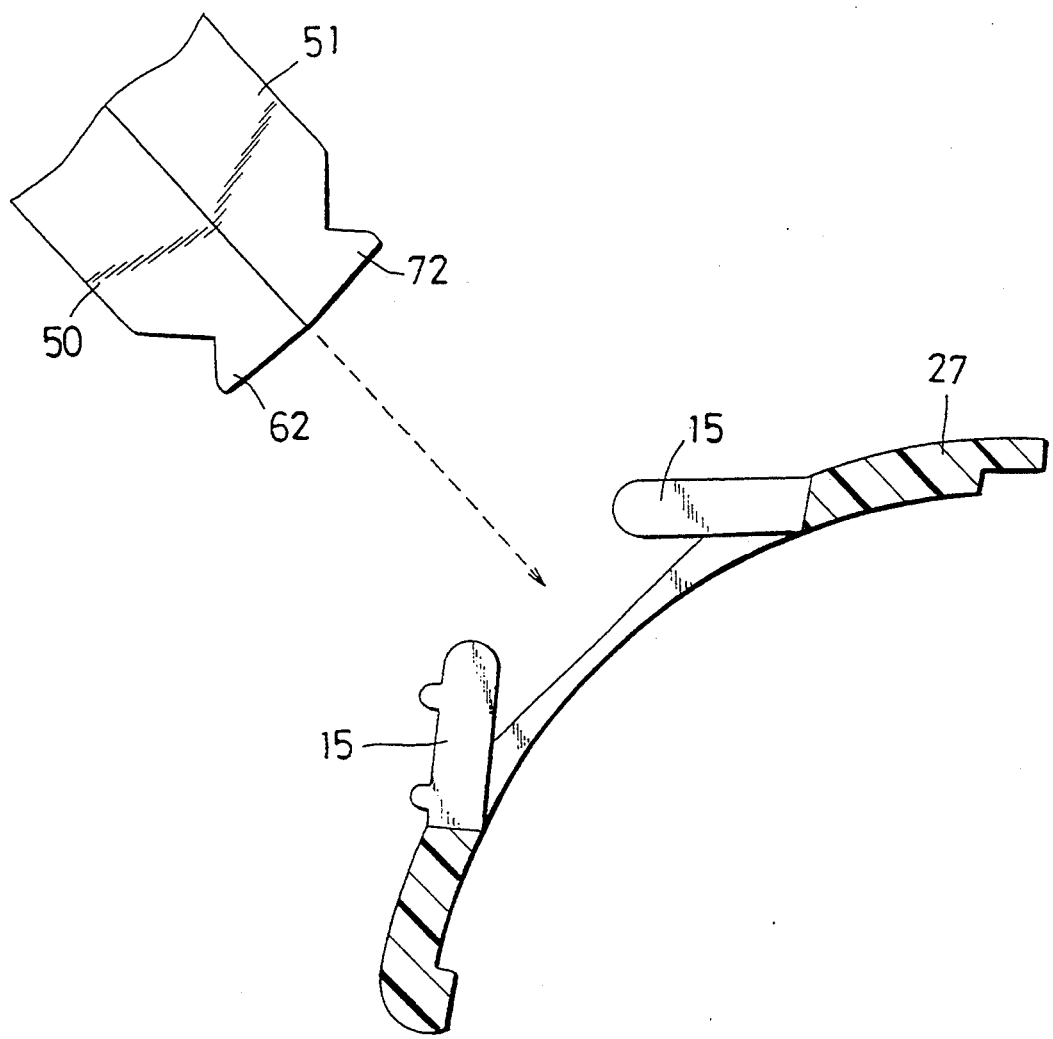
FIG. 9 is an enlarged sectional view showing an engaging claw provided for the barrel of the shooting scope according to one embodiment of the present invention.

FIGS. 7 to 9 are diagrams showing in detail respective portions of the shooting scope, where FIG. 7 is an exploded perspective view illustrating a main body portion of the shooting scope (portions excluding a gunsight), FIG. 8 is an exploded perspective view illustrating the gunsight, and FIG. 9 is a diagram showing in detail an engaging claw. Description is now made of the details of the respective portions.

In FIG. 7, a right inner housing 21 and a left inner housing 22 are attached to each other by screws 23, to form a part of a barrel 8 and a grip 6. A finger putting member 26 is contained between a grip portion 24 of the right inner housing 21 and a grip portion 25 of the left inner housing 22.

A right outer housing 27 and a left outer housing 28 respectively cover parts of the outer peripheries of the right inner housing 21 and the left inner housing 22, and fixedly mounted on the right inner housing 21 and the left inner housing 22 by screws 29. A stock 7 is fitted and fixed to the lower rear parts of the right outer housing 27 and the left outer housing 28. In addition, a battery box 45 is formed on the rear parts of the right outer housing 27 and the left outer housing 28.

A muzzle protecting cover 30, a lens 31, a cursor switch SW4, a micro switch 32 which is turned on or off by the cursor switch SW4, a control circuit 33, a switch case 34, battery contacts 35 and 36, an LED driver 37, an infrared LED 38, and an LED cover 39 are contained between the right inner housing 21 and the left inner housing 22. The control circuit 33 is fixed to the left inner housing 22 by screws 43.

The muzzle protecting cover 30 is in a ring shape, and is held with it being interposed between the right inner housing 21 and the left inner housing 22. The lens 31 is for gathering light incident from a television receiver 4 and introducing the light into a light receiver provided for the control circuit 33. Slit walls 40 and 41 are formed inside of the right inner housing 21 and the left inner housing 22 at position behind the lens 31. The inner diameter of the slit wall 41 is made smaller than the inner diameter of the slit wall 40. The slit walls 40 and 41 prevent undesired disturbance light from entering the inside of the barrel 8.

The cursor switch SW4 is rotated around a shaft 42 provided for the left inner housing 22, thereby to turn the micro switch 32 on or off. An on-off signal of the micro switch 32 is applied to the control circuit 33. This control circuit 33 comprises the light receiver for converting a partial display image of the television receiver which is incident from the muzzle 9 into an electric signal, as described above. The control circuit 33 controls the operation of the LED driver 37 on the basis of a light receiving signal from the light receiver, the on-off signal from the micro switch 32, a switch operation signal from the switch case 34. The infrared LED 38 outputs an infrared signal when it is driven by the LED driver 37. This infrared signal is directed to the receiver 3 shown in FIG. 1 through the LED cover 39. The LED driver 37, the infrared LED 38 and the LED cover 39 constitute the above described infrared transmitter 11. This infrared transmitter 11 has the advantage that the infrared signal easily reaches the receiver 3 provided on the television receiver 4 because it is provided in the upper front part in the longitudinal direction of the barrel 8 as described above.

A switch substrate 44, and the trigger switch SW1, the pause switch SW2 and the power supply/continuous shooting switch SW3 which are provided on the switch substrate 44 are contained inside of the switch case 34. The battery contacts 35 and 36 are fitted in both ends of the battery box 45. Cells serving as the power supply for driving the shooting scope are contained inside of the battery box 45. The battery contact 35 is connected to the control circuit 33 through the above described switch substrate 44. A cover 46 is detachably mounted on the battery box 45.

In FIG. 8, a gunsight 10 comprises a right scope housing 50, a left scope housing 51, a scope body 52, an eye cap 53, and a foresight 14. The left scope housing 51 is affixed to the right scope housing 50 by screws 54. At this time, the foresight 14 is fitted and fixed between the right scope housing 50 and the left scope housing 51. The right scope housing 50 and the left scope housing 51 constitute the above described mount 12. The scope body 52 is inserted between a scope holding portion 55 of the right scope housing 50 and a scope holding portion 56 of the left scope housing 51. The eye cap 53 is detachably mounted on one end of the scope body 52 so as to protect player's eyes.

A projected portion 61 having an L shape in cross section and a projected portion 62 having a wedge shape in cross section which extend in the longitudinal direction are formed in the lower front end of the right scope housing 50. In addition, a projected portion 63 having an L shape in cross section and a projected portion 64 having a wedge shape in cross section are formed in the lower rear end of the right scope housing 50. Further, a recess portion 65 is formed in an approximately central part of the projected portion 63. Similarly, projected portions 71, 72, 73 and 74 and a recess portion 75 are formed in the lower part of the left scope housing 51. The projected portions 61 and 71 constitute a first engaging guide, and the projected portions 62 and 72 constitute a first engaging portion. The projected portions 63 and 73 constitute a second engaging guide, and the projected portions 64 and 74 constitute a second engaging portion. The recess portions 65 and 75 constitute a locking groove.

In FIG. 9, a pair of engaging claws 15 is integrally formed on the surface of the right outer housing 27. More specifically, each of the engaging claws 15 is formed with a part of the right outer housing 27 being projected obliquely upward. Consequently, each of the engaging claws 15 has elasticity in the direction of the diameter of the barrel 8. The engaging claws 15 are engaged with the first engaging portion constituted by the projected portions 62 and 72 having a wedge shape provided in the lower part of the mount 12, to hold the gunsight 10. The other engaging claws 16, 18 and 19 have the same structure as that of the engaging claws 15 shown in FIG. 9.

Description is now made of a case where the gunsight 10 is attached or detached to or from the barrel 8. The first engaging guide constituted by the projected portions 61 and 71 and the second engaging guide constituted by the projected portions 63 and 73 are respectively mounted inside the engaging claws 15 and 16. Thereafter, the whole gunsight 10 is slid toward the front of the barrel 8, that is, the muzzle 9. Consequently, the first engaging portion constituted by the projected portions 62 and 72 and the second engaging portion constituted by the projected portions 64 and 74 are respectively engaged with the engaging claws 15 and 16, to be held in the barrel 8. At this time, the locking claw 17 is displaced toward the inside of the barrel 8 against its elastic force. If the locking groove constituted by the grooves 65 and 75 is located above the locking claw 17, however, the locking claw 17 is engaged with the locking groove by the elastic force. Consequently, the gunsight 10 is so locked as not to be easily slid. When it is desired to release the locked state, the locking claw 17 may be depressed by hand to displace the locking claw 17 toward the inside of the barrel 8. Accordingly, the engaged state of the locking claw 17 and the locking groove is released, so that the gunsight 10 is slidable. The gunsight 10 is mounted on the other engaging claws 18 and 19 and the locked state is released in the same manner as described above.

Meanwhile, the shooting scope 5 according to the present embodiment is generally used in a position close to, that is, spaced apart from the television receiver 4 by approximately 3 meters, as shown in FIG. 10. Consequently, if the sighting axis and the optical axis are parallel to each other, coordinates on the television screen of an extension line of the sighting axis and an extension line of the optical axis are considerably shifted. In the present embodiment, therefore, the shooting scope 5 is so constructed that when the gunsight 10 is mounted on the barrel 8, the gunsight 10 makes a predetermined angle with the optical axis so that the sighting axis crosses an optical axis of the lens 31 or forms an intersection a predetermined distance (for example, approximately 3 meters) ahead of the nozzle 9. Specifically, the gunsight 10 is so selected that the sighting axis in a case where the foresight 14 is looked into from the scope body 52 is directed slightly downward with respect to the bottom surfaces of the scope housings 50 and 51, and is mounted on the upper part of the barrel 8 and a position at an angle 45° on the right or left side with the vertical axis passing through the optical axis. Consequently, whichever of the engaging claws 15 and 16 or the engaging claws 18 and 19, that is, whichever of the upper left or the upper right of the barrel 8 is a position where the gunsight 10 is mounted, the optical axis and the sighting axis can be made to cross (or concentrated on one point) on the screen of the television receiver 4 a predetermined distance ahead of the nozzle 9, thereby to make it possible to shoot the target accurately and with high precision. In addition, since the gunsight 10 is detachably constructed in the position at an angle of 45° on the right or left side with the optical axis, a user can surely aim at the target irrespective of the dominance hand, the dominant eye and the size of a user's face, thereby to make it possible to further improve the operability.

Description is now made of a state where a large shock is given to the gunsight 10 mounted on the barrel 8 for any cause (for example, the drop). In this case, the engaging claws 15, 16, 18 and 19 respectively have elasticity. If a large shock is given to the gunsight 10, therefore, each the engaging claws is displaced toward the outer periphery of the barrel 8, to release the engaged state of the gunsight 10. When the shock is thus given to the gunsight 10, therefore, the gunsight 10 is detached from the barrel 8. Accordingly, no excessive force is exerted on the gunsight 10, and the gunsight 10 is prevented from being damaged. In addition, it is possible to prevent a player from being injured due to the damage.

Description is now made of a method of using the shooting scope according to the above described embodiment and the principle thereof. First, a player carries the shooting scope with the stock 7 on his shoulder, grasps the grip 6 by his one hand, and puts his other hand on the trigger switch SW1 and the reset switch SW2. When the player sights the target displayed on the television receiver 4 by the gunsight 10 and then, depresses the trigger switch SW1, an image of a part of the display screen of the television receiver 4 on which light is gathered by the lens 31 (an image in the vicinity of the sighting axis of the gunsight 10) is detected by the light receiver provided for the control circuit 33. The control circuit 33 amplifies and waveform-shapes a light receiving signal of the light receiver (a pulse signal having horizontal scanning cycle) and lights the LED 38 on the basis of the pulse signal. Consequently, an infrared signal which is synchronized with the light receiving pulse is transmitted toward the receiver 3. The receiver 3 detects the infrared signal from the shooting scope 5 and transmits the same to the video game set 1. The video game set 1 collates a coordinate position which is shot with a coordinate position of the target on the basis of a transmission signal from the receiver 3, to judge whether or not a bullet hits the target. At this time, the player depresses the switch SW1 and/or SW2 downward from above the barrel 8. However, the player grasps the grip 6 in the front part of the barrel 8 by his hand which is not used for operating the switch, and carries the shooting scope with the stock 7 in the rear part of the barrel 8 on his shoulder. Even if a strong force for depressing the switch SW1 or SW2 is exerted, the shooting scope can be held in a stable state without moving up and down. As a result, the target can be accurately aimed at.

As described in the foregoing, according to the present invention, the pair of holding means for holding the gunsight is provided in the upper right and left parts of the barrel. Accordingly, the position where the gunsight is mounted can be changed to a position where a player can easily use the gunsight. Consequently, the optical axis and the sighting axis can be made to cross a predetermined distance ahead irrespective of the right and left positions of the gunsight, thereby to make it possible to obtain a shooting scope significantly superior in operability.

Furthermore, according to the present invention, the sighting axis of the gunsight and the optical axis of the light receiving means can form an intersection in a position spaced apart from the muzzle of the barrel by a predetermined distance, thereby to obtain the effect of easily sighting the target accurately even if the distance between the gunsight and the barrel is long.

Additionally, according to the present invention, the holding means releases the engaged state when a strong force is exerted on the gunsight. Accordingly, the gunsight is detached from the barrel, and no excessive force is exerted on the gunsight. Therefore, it is possible to prevent the gunsight from being damaged and consequently, prevent the player from being injured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shooting scope used for a game in which an image from a video game set is displayed on an image display device and a target displayed on the image display device is shot from a position spaced apart from the target, comprising:
   a cylindrical barrel;
   a gunsight detachably mounted, in use, on the upper part in the longitudinal direction of said barrel for sighting the target displayed on the screen of the image display device;
   a light receiver provided inside of said barrel for receiving light from the image display device;

a barrel engaging portion formed in a lower mounting portion of said gunsight for securing said gunsight to said barrel;

a pair of gunsight holders secured to said barrel and provided in positions symmetrical on both the right and left sides with respect to an optical axis of said light receiver as viewed from above said barrel for coupling said barrel with said barrel engaging portion in said gunsight;

operating means provided on said barrel; and signal generating means for applying a signal to the video game set in response to operation of said operating means.

2. The shooting scope according to claim 1, wherein said gunsight is so formed as to make a predetermined angle with the optical axis of said light receiver so that a sighting axis of the gunsight and the optical axis of the light receiver form an intersection in a position spaced apart from the muzzle of said barrel by a predetermined distance.

3. The shooting scope according to claim 1, wherein said pair of gunsight holders comprises an engaging claw integrally formed in said barrel and having elasticity generally in the radial direction of said cylindrical barrel, said engaging claw fixedly holding said gunsight in cooperation with said engaging portion and releasing the engaged state when a predetermined force is exerted thereon.

4. The shooting scope according to claim 1, wherein said barrel comprises a stock formed on the lower rear part in the longitudinal direction thereof so that a user holds the barrel with the stock on his shoulder.

5. The shooting scope according to claim 4, wherein said barrel comprises a grip formed on the lower front part in the longitudinal direction thereof, and said operating means is provided in a position between said grip and said stock in the longitudinal direction of said barrel and a position where it can be depressed from above the barrel.

6. The shooting scope according to claim 1, wherein said operating means comprises a first switch for generating a shooting signal in a single-shot manner every time it is depressed and a second switch for continuously generating a shooting signal while it is depressed.

7. The shooting scope according to claim 1, wherein said pair of gunsight holders include locking means for fixing said gunsight when said gunsight is mounted on said barrel is formed in the barrel.

8. The shooting scope according to claim 7, wherein said locking means comprises a locking claw integrally formed on said barrel and elastically moveable between locked and unlocked positions, an engaging groove formed on the bottom surface of said gunsight for engaging with said locking claw wherein said locking claw is fitted in said engaging groove at the time of mounting said gunsight, thereby to inhibit said gunsight from being slid in the longitudinal direction of said barrel.

9. A shooting scope used for a game in which an image from a video game set is displayed on an image display device and a target displayed on the image display device is shot from a position spaced apart from the target, comprising:

a cylindrical barrel;

a gunsight detachably mounted on said barrel for sighting the target displayed on the screen of the image display device;

a light receiver provided inside of said barrel for receiving light from the image display device;

a barrel engaging portion formed in a lower mounting portion of said gunsight for securing said gunsight to said barrel;

a pair of gunsight holding mechanisms provided in positions symmetrical on both the right and left sides with respect to an optical axis of said light receiver as viewed from above said barrel for coupling said barrel with said barrel engaging portion in said gunsight;

operating means provided in any position of said barrel;

signal generating means for applying a signal to the video game set in response to operation of said operating means;

said gunsight holding mechanisms having a resilient engaging claw integrally formed on said barrel;

said engaging claw stably holding said gunsight in cooperation with said engaging portion when in a locked position and releasing the engaged state if moved to an unlocked position.

10. The shooting scope according to claim 9, wherein said gunsight is so formed as to make a predetermined angle with the optical axis of said light receiver so that a sighting axis of the gunsight and the optical axis of the light receiver form an intersection in a position spaced apart from the muzzle of said barrel by a predetermined distance.

11. The shooting scope according to claim 9, wherein said barrel comprises a stock formed on the lower rear part in the longitudinal direction thereof so that a user holds the barrel with the stock on his shoulder.

12. The shooting scope according to claim 11, wherein said barrel comprises a grip formed, in use, on the lower front part in the longitudinal direction thereof, and said operating means is provided in a position between said grip and said stock in the longitudinal direction of said barrel and a position where it can be depressed from above the barrel.

13. The shooting scope according to claim 9, wherein said operating means comprises a first switch for generating a shooting signal in a single-shot manner every time it is depressed and a second switch for continuously generating a shooting signal while it is depressed.

14. The shooting scope according to claim 9, wherein said gunsight holding mechanisms further comprise locking means for fixing said gunsight when said gunsight is mounted.

15. The shooting scope according to claim 14, wherein said locking means comprises a locking claw integrally formed on said barrel and having elasticity in a generally radial direction, an engaging groove formed on the bottom surface of said gunsight for engaging with said locking claw formed on the bottom surface of said gunsight, wherein said locking claw is fitted in said engaging groove at the time of mounting said gunsight, thereby to inhibit said gunsight from being slid in the longitudinal direction of said barrel.

16. A shooting scope for a television monitor based video game system for shooting targets displayed on said television monitor comprising:
   a barrel,
   a gunsight detachably mounted on said barrel for sighting the target displayed on the television screen;
   said gunsight having a locking groove formed in a mounting portion thereof; and
   first and second gunsight holding mechanisms disposed, in use, on the left and right portions of said barrel; each of said first and second gunsight holding mechanisms including a resilient locking member for cooperating with said locking groove to stably hold said gunsight when in a locked position and for releasing said gunsight when moved to an unlocked position.

17. The shooting scope according to claim 16, further including a first switch for generating a shooting signal in a single-shot manner and a second switch for continuously generating a shooting signal.

18. The shooting scope according to claim 16, wherein
   said locking member comprises a locking claw integrally formed on said barrel and having elasticity in a generally radial direction wherein said locking claw is fitted in said locking groove at the time of mounting said gunsight, thereby to inhibit said gunsight from being slid in the longitudinal direction of said barrel.

* * * * *